United States Patent
Batistelli

[15] 3,662,796
[45] May 16, 1972

[54] SAWDUST DEFLECTOR FOR PORTABLE SAW

[72] Inventor: Nello Batistelli, 9929 South Downey & Sanford Bridge Rd., Downey, Calif. 90240

[22] Filed: Nov. 6, 1970

[21] Appl. No.: 87,412

[52] U.S. Cl.....................143/159 H, 143/157 A, 144/252, 143/159 J
[51] Int. Cl............................................B27g 19/00
[58] Field of Search............143/159 H, 159 J, 159 R, 157 A, 143/157, 43 A, 43 B, 43 C, 43 D, 43 E, 43 F; 144/251, 252

[56] References Cited

UNITED STATES PATENTS

| 1,830,579 | 11/1931 | Wappat.............................143/159 H |
| 2,876,810 | 3/1959 | Peterson et al. ....................143/159 H |

*Primary Examiner*—Donald R. Schran
*Attorney*—Fred N. Schwend

[57] ABSTRACT

A deflector mountable on the saw blade guard of a portable rotary saw for deflecting sawdust, splinters and other cuttings, comprising a transparent semi-circular channel member adapted to be attached to the saw guard of the saw and effective to deflect the cuttings downwardly without interfering with the operator's view of the saw blade and workpiece at the cutting point.

3 Claims, 6 Drawing Figures

Patented May 16, 1972
3,662,796
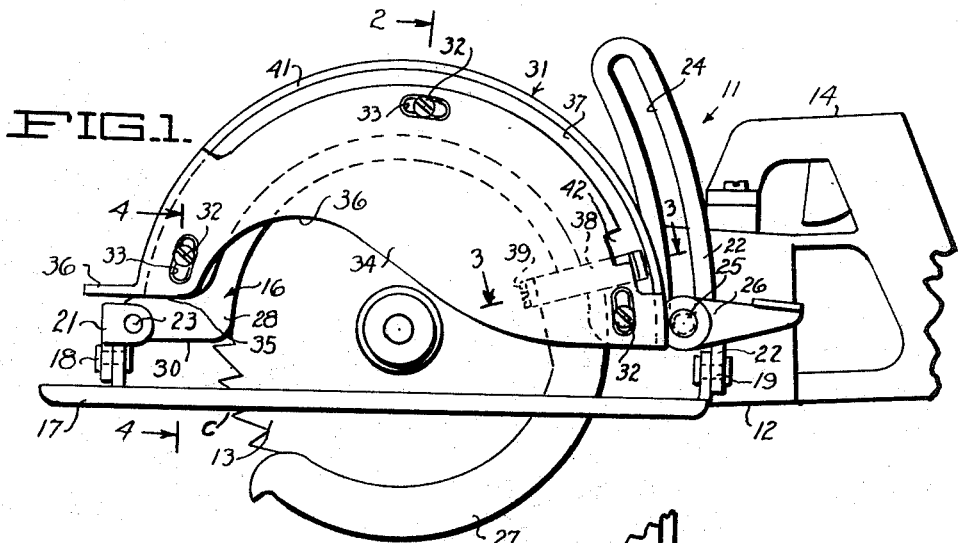
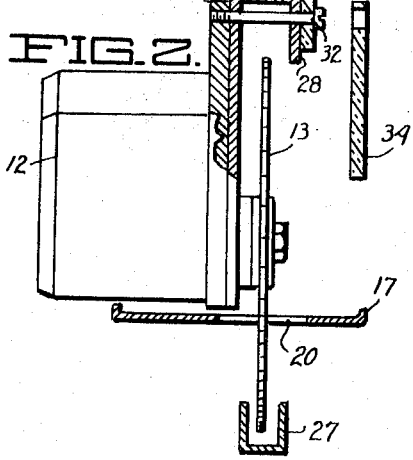
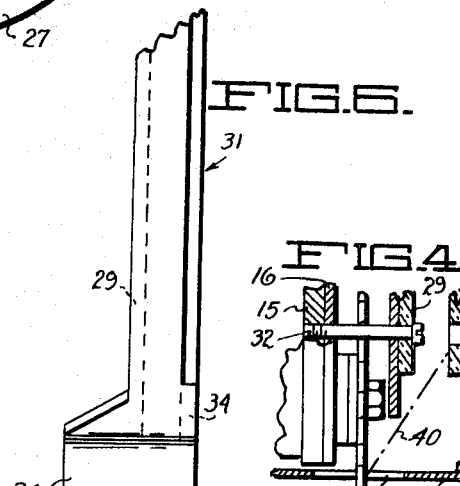
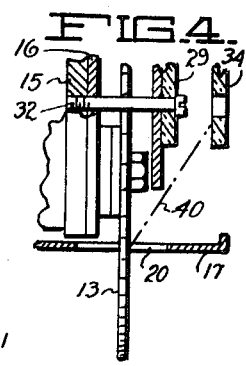
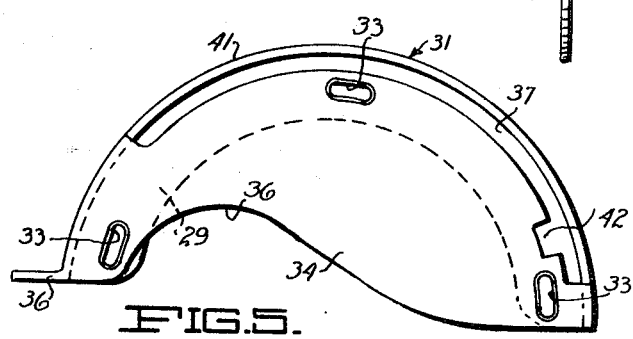
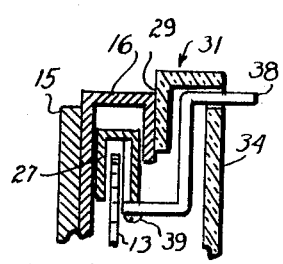
INVENTOR.
NELLO BATISTELLI
BY
Fred H. Schmank

SAWDUST DEFLECTOR FOR PORTABLE SAW

BACKGROUND OF THE INVENTION

1. Field of the Invention

This invention relates to portable rotary saws and has particular reference to means for deflecting sawdust, etc. away from the operator.

2. Description of the Prior Art

Heretofore, saws of the above type have generally been provided with saw blade guards whose principal purpose is to prevent damage to the rotating sawblade and injury to the operator, although they also serve to deflect a large portion of the sawdust, splinters and other cuttings from striking the operator. Such blade guards generally comprise an upper channel-shaped guard which is fixed to the saw housing and extends rather closely around the upper part of the saw blade, and a lower channel-shaped guard which is pivotal about the axis of the saw blade and also extends rather closely around the lower part of the saw blade.

Such guards work quite satisfactory in guarding against damage to the saw blade and injury to the operator. However, since their main purpose is to insure safety in this respect, their side flanges must be located relatively close to the sides of the saw blade so that pieces or strips cut by the saw will not tend to be jammed between the saw blade and the guard or be thrown outwardly by the blade. Also, the blade guards must not interfere with the operator's view of the workpiece at the cutting point. Therefore, the outside flanges of the blade guards must be cut back sufficiently to permit the cutting point to be viewed at all times by the operator regardless of the angle at which the saw is cutting relative to the workpiece.

Because of the above-noted restrictions on the size and shape of the saw blade guards, they are not entirely effective in deflecting sawdust, splinters, etc. away from the operator. That is, as the cutting teeth of the saw blade engage the workpiece, and particularly, as they emerge from the upper surface of the workpiece, they may throw the sawdust, etc. outward at an angle such that it misses the blade guards and strikes the operator. This may be aggravated by wind or air currents developed by the rotating saw blade. Obviously, the sawdust, etc. creates an eye hazard, particularly if the operator must closely and intently watch the cutting point to insure that the cut is properly made. Although, as suggested by several saw manufacturers, the operator should wear safety glasses to prevent the cuttings from striking his eyes, such operators are prone to consider safety glasses a nuisance and not wear them. Further, when worn, such safety glasses tend to become clouded with bits of sawdust, which adhere to the glasses and thus the glasses become a hazard in themselves.

Although attempts have been made to use transparent windows or transparent side flanges in saw blade guards which more completely cover the saw blade, these have not proven satisfactory because here also, the flying sawdust tends to cloud the transparent portions and thus obscure the cutting point of the saw blade from the operator. Also, there must be sufficient clearance between the saw blade guard and the workpiece to enable the saw to be set at an angle to cut angle or bevel cuts.

SUMMARY OF THE INVENTION

A principal object of the present invention is to provide a deflector for portable rotary saws which will deflect sawdust and other cuttings from the operator while permitting him to directly view the cutting point of the saw blade.

Another object of the invention is to provide an inexpensive reflector for saw cuttings which may be quickly and readily mounted on a portable rotary saw.

According to the invention, the deflector comprises a transparent semi-circular channel member having an inner side flange adapted to fit against the side flange of the saw guard of a portable rotary saw, a forwardly extending flange, and an outer side flange shaped to catch any sawdust, splinters or other cuttings, which I will hereafter term sawdust, thrown outwardly, by the saw blade and yet permit an unhindered view of the cutting point by the operator. That is, although he may generally view the saw blade and workpiece through the transparent sides of the deflector, the operator may directly view the cutting point and thus not be hindered by the deflector in the event its surfaces become scratched, dirty or clouded by bits of sawdust adhering to its surfaces.

BRIEF DESCRIPTION OF THE DRAWINGS

FIG. 1 is a side view of a portable electrically driven rotary saw having attached thereto a preferred form of sawdust deflector according to the present invention.

FIG. 2 is a view, partly in section, taken along line 2—2 of FIG. 1.

FIG. 3 is a sectional view taken along line 3—3 of FIG. 1.

FIG. 4 is a sectional view taken along line 4—4 of FIG. 1.

FIG. 5 is a side view of the deflector per se.

FIG. 6 is a top plan view of the deflector, partly broken away.

DESCRIPTION OF THE PREFERRED EMBODIMENT

Referring to the drawing, a portable, electrically driven, rotary saw of conventional construction is generally indicated at 11 and comprises a housing 12 containing a motor, gearing and bearings (not shown) for rotatably supporting and driving a toothed saw blade 13. The housing terminates at its rear end in a handle 14 for carrying and guiding the saw. The housing also has a flange 15 integral therewith, to the side of which an upper saw blade guard 16 is attached. The latter is semi-circular and channel-shaped to extend around the upper part of the saw blade.

A guide base 17 for guiding the saw over the workpiece to be cut is pivotally mounted at 18 and 19 for tilting adjustment about a fore and aft axis on brackets 21 and 22, respectively. This axis extends adjacent the plane of the saw blade. The base 17 has a portion 20 cut out to permit the blade 13 to extend therethrough.

Bracket 21 is pivotally mounted at 23 on the upper guard 16 for adjustment about a laterally extending axis. Bracket 22 has an arcuate slot 24 therein slidable over a threaded stud 25 extending from the housing 12 and is adapted to be secured thereto in different adjusted positions by clamp nut 26 whereby to locate the base 17 in different tilted positions about the pivot 23. Suitable means, not shown, is provided to lock the base 17 in any of different tilted positions about the pivots 18 and 19.

A lower saw guard 27 is pivotally supported by the housing 12 in a manner not shown for movement about the axis of the blade 13. Guard 27 is substantially semi-circular and channel-shaped to extend around the lower part of the blade 13. A spring, not shown, normally holds the guard 27 in its illustrated closed or forward position. However, when a workpiece engages the guard 27 during a cutting operation, the guard is swung counterclockwise until its forward end is raised above the plane of the workpiece, permitting the latter to pass thereunder.

It will be noted that the saw can be adjusted about the axis of the pivots 18 and 20 to make bevel cuts and, for this purpose as well as to enable the operator to view the cutting point, i.e. point C, the lower edge 30 of the flange 28 of the guard 27 terminates a substantial distance above the base 17.

According to the present invention, a transparent, semi-circular deflector 31 is provided which is channel-shaped in cross section. The inner flange 29 of the deflector is adapted to engage the outer side of the flange 28 of the upper saw guard 16 and is attached thereto by three screws 32 which extend through slots 33 in the flange 29 and fixedly clamp both the deflector 31 and saw guard 16 in place on the housing 12.

The outer flange 34 of the deflector is spaced laterally from the inner flange 29 by an arcuate wall 41 and terminates at 35 in spaced relation to both the cutting point C and the bottom edge 30 of the guard 16 and then curves upwardly at 36 to permit unimpaired visibility of such cutting point by the operator from a position rearwardly and upwardly of the saw. The rear portion of the flange 34 curves downwardly to adequately shield the operator from any rearwardly flying bits of sawdust.

A forwardly extending horizontal flange 36 is formed integral with the forward part of the deflector to intercept any sawdust which might fly upwardly from the cutting point and forwardly of the guard 16. Such sawdust could otherwise be blown rearwardly by wind into the operator's face. It will be noted in FIG. 6 that the flange 36 also extends laterally to catch or deflect sawdust thrown out sideways by the saw blade.

An arcuate slot 37 is formed in the flange 34 to permit a handle 38 (FIG. 3) fixed as by screws 39 to the lower saw guard 27 to project therethrough and be operated manually so as to open or close the lower guard at will. An enlarged slot 42 is formed at the forward end of the slot 37 to facilitate assembly of the deflector over the handle.

It will be noted that even though the bottom edge 35 of the deflector is located above the bottom edge 30 of the saw guard 16 to insure an unimpaired view of the cutting point by the operator in different tilted or adjusted positions of the saw relative to the workpiece, any sawdust thrown outwardly along, for example, a line 40 (FIG. 4) will be caught by the flange 34 or the curved wall 41 of the deflector and will drop harmlessly down away from the operator's face.

The slots 33 enable the deflector to be attached to different saws having the same nominal blade diameter capacity and in which the holes for the screws 32 are located in different positions around the saw guard.

I claim:

1. A sawdust deflector for attachment to the side of a saw blade guard of a portable rotary saw comprising
   a transparent arcuate channel member having
   an arcuate wall,
   a first side flange at one end of said wall adapted to be attached to one side of said saw blade guard, and
   a second side flange at the opposite end of said wall;
   said second side flange terminating above the cutting point of said blade, and
   a horizontal sawdust deflecting flange extending forwardly of said arcuate wall.

2. A sawdust deflector according to claim 1 wherein the bottom edge of said second side flange curves upwardly and rearwardly whereby to enable an operator to view said cutting points below said second side flange and from a point rearwardly and upwardly from said cutting point.

3. A sawdust deflector according to claim 2 wherein said saw has a second saw blade guard pivotal about the axis of said saw blade and a handle on said second guard,
   said second side flange having an arcuate slot therein to receive said handle and to permit movement of said handle to pivot said second guard.

* * * * *